United States Patent [19]

Maisonneuve et al.

[11] Patent Number: 4,905,309
[45] Date of Patent: Feb. 27, 1990

[54] OPTICAL REMOTE CONTROL SYSTEM

[75] Inventors: Jean-Michel Maisonneuve, Toulouse; Francis Lacan, Saintgeniez d'Olt; Jean-Paul Domergue, Toulouse, all of France

[73] Assignee: Aerospatiale Societe Nationale Industrielle, Paris, France

[21] Appl. No.: 249,190

[22] PCT Filed: Jan. 27, 1988

[86] PCT No.: PCT/FR88/00044
§ 371 Date: Aug. 23, 1988
§ 102(e) Date: Aug. 23, 1988

[87] PCT Pub. No.: WO88/05980
PCT Pub. Date: Aug. 11, 1988

[30] Foreign Application Priority Data

Jan. 28, 1987 [FR] France ............... 87 01004

[51] Int. Cl.⁴ ............................. H04B 9/00
[52] U.S. Cl. ................................. 455/603
[58] Field of Search ............ 455/600, 603, 606, 607, 455/608, 609, 610, 611, 612, 613, 617, 618, 619; 370/4

[56] References Cited

U.S. PATENT DOCUMENTS 4,402,090 8/1983 Gfeller .................... 370/4
4,434,510 2/1984 Lemelson ................ 455/606

FOREIGN PATENT DOCUMENTS

| 0053790 | 6/1982 | European Pat. Off. | 455/612 |
| 0075701 | 4/1983 | European Pat. Off. | 455/612 |
| 55-16552 | 2/1980 | Japan | 455/612 |
| 0076951 | 5/1982 | Japan | 455/603 |
| 0139538 | 8/1983 | Japan | 455/612 |
| 0117835 | 1/1985 | Japan | 455/618 |
| 0036616 | 2/1988 | Japan | 455/603 |
| 2064112 | 6/1981 | United Kingdom | 455/612 |
| 2165712 | 4/1986 | United Kingdom | 455/612 |

Primary Examiner—Robert L. Griffin
Assistant Examiner—L. Van Beek
Attorney, Agent, or Firm—Fisher, Christen & Sabol

[57] ABSTRACT

An emission device includes a first electro optical converter for converting electrical energy from a supply source into optical energy. A second electrical converter is provided to convert the electrical energy into digital information which is converted into digital optical information by a second electro optical converter. A reception device includes two optoelectrical converters connected to the electro optical converters by an optical path, and an electrical power accumulator capable of storing said electric power delivered by said optoelectric converter. The power accumulator is capable of supplying the reception device with electric power.

14 Claims, 4 Drawing Sheets

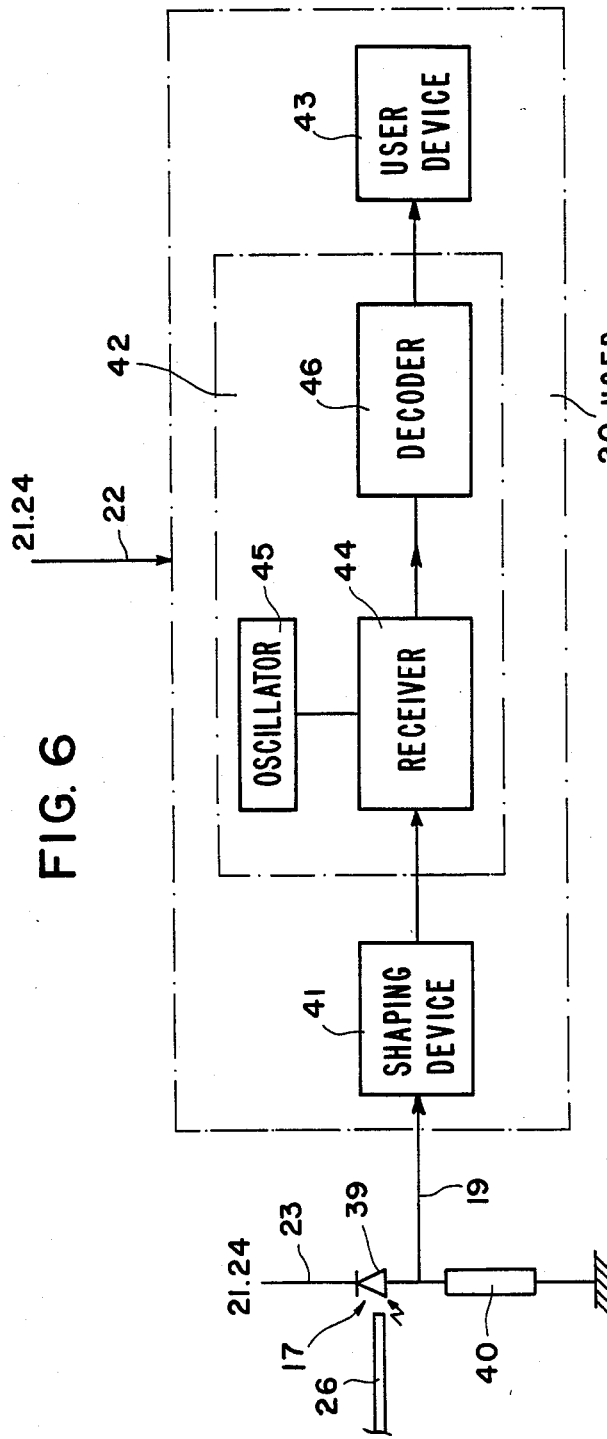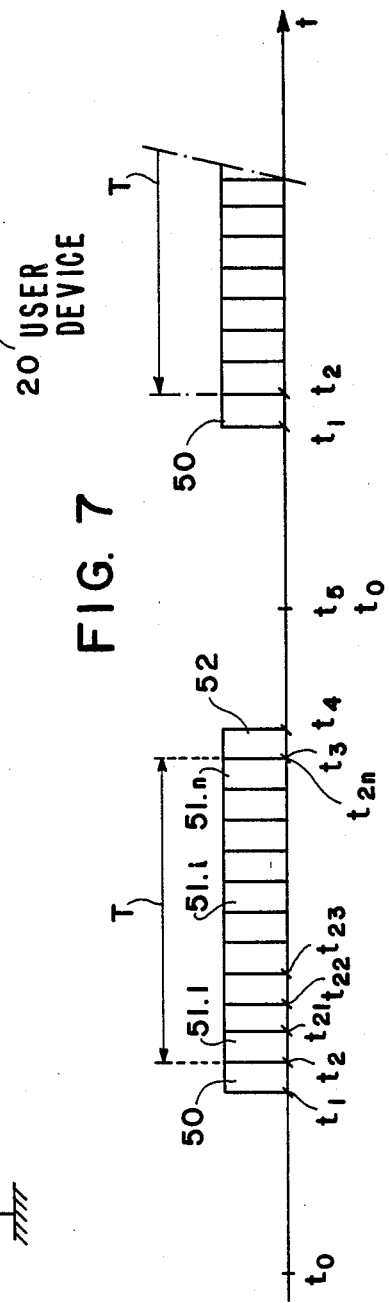

OPTICAL REMOTE CONTROL SYSTEM

The present invention relates to a system for remote-control of an electric device by optical means.

Systems are already known for transmitting by optical means information signals between an emitter and a receiver each provided with a source of electrical supply. Systems are also known in which a signal is transmitted by optical means between an emitter, provided with a source of electrical supply and a receiver, bereft of a local source of electrical supply, the signal itself containing the energy necessary for exploitation thereof by the receiver. However, in this latter case, the energy transmitted by said signal is weak and allows only the execution of a simple function of the receiver, such as a triggering.

The present invention has for its object a system of the type mentioned above, in which the receiver, although bereft of a local source of electrical supply or provided with an exhaustible local electrical source, allows a continuous complex exploitation cf the electrical information signal transmitted optically by the emitter. Although of general application, this system according to the invention is particularly appropriate for operating, controlling or monitoring an electric apparatus disposed in part of an aircraft not provided with an electrical source. Such an apparatus may for example be a sensor, a servo-valve, a display screen or the like. The present invention is also particularly interesting to carry out for controlling the ringing of telephone sets of optical networks.

To that end, according to the invention, the system for remote-control of an electric device and comprising, on the one hand, an emission device provided with a source of electrical supply, a generator generating electrical information intended for controlling said electric device and a first electro-optical converter for converting said electrical information into optical information and, on the other hand, a reception device provided with a first opto-electrical converter capable of reconverting said optical information into electrical information in order to control said electric device, the emission device and the reception device being connected by optical channel is noteworthy in that:
- the emission device comprises a second electro-optical converter for converting the electrical energy of the supply source into optical energy; and
- said reception device comprises:
  a second opto-electrical converter connected to said second electro-optical converter by said optical channel and capable of reconverting the optical energy into electrical energy; and
  an accumulator of electrical energy capable of storing the electrical energy delivered by said second opto-electrical converter and of supplying electrical energy, at least partially, to the electric device.

Thus, thanks to the system according to the invention, not only the electrical information controlling the electric device but also the electrical power indispensable for the operation of the latter, issue from the emission device and are transmitted via the optical channel.

The second electro-optical converter of the emission device may be of thermal type. However, it is preferable if it is constituted by a laser diode.

For certain applications, the solar radiation picked up at the emission device may directly ensure supply of optical energy to the reception device.

The second opto-electrical converter of the reception device is advantageously of the photovoltaic photodiode type, naturally adapted to the second electro-optical converter. In order to be able to obtain at the output of said opto-electrical converter a voltage (for example of the order of 5 V) sufficient for operation of the electronics of the reception device, it is advantageous if the second opto-electrical converter is formed by the assembly in series of a plurality of photodiodes operating in photovoltaic mode.

The arrangement of the photodiodes and the electrical assembly adopted are obviously a function, respectively, of the spatial distribution of the radiation received, as well as of the desired level and sign of the voltage.

The energy accumulator of the reception device may be a capacitor (associated with a load resistor), or a photo-electric cell. It may constitute by itself the source of power necessary for the electrical supply of the reception device or may serve to maintain the charge of a power source, of the accumulator battery type, provided in the reception device. In this way, said electrical energy accumulator either totally supplies the electrical device, or participates in the supply thereof.

The transmission of energy between the second electro-optical converter of the emission device and the second opto-electrical converter of the reception device may be sequential. In that case, the transmission of energy may be effected via the same optical channel as the information signals, in series, between the sequences of transmission of the information for controlling the electric device. However, it is advantageous if the transmission of energy is continuous.

In the case of the electric device controlled by the reception device comprising in known manner an electrical apparatus (sensor, servo-valve, display, etc. . . . ) and an electronic control device controlling said apparatus, it is advantageous if this electrical control device is of digital type and, for example, comprises a microprocessor. In order to avoid the presence of an analog-to-digital converter in the reception device (and therefore in order to reduce the electrical power necessary for supplying the reception device), it is then preferable if the generator of the emission device emits digital information. If the electrical apparatus of the reception device must function in liaison with a measuring apparatus (sensor) of analog type provided in the emission device, the latter will therefore comprise an analog-to-digital converter to convert the information delivered by the measuring apparatus.

For transmitting digital information between the emission device and the reception device, the first electro-optical converter of the emission device may be an electro-luminescent diode, whilst the first opto-electrical converter of the reception device may either be of the photovoltaic type, or, when the flow of digital information is high, of the photoconductor type, for example a photodiode of PIN type.

Particularly in order to avoid losses of power which result from the coupling between the power signals and the information signals, the optical channel preferably comprises two independent optical fiber arrangements, allocated respectively to the transmission of the optical information and to that of the optical energy.

In the case of the emission device emitting digital information, it is advantageous if the generator comprises a microprocessor.

In order to reduce the electrical energy consumption at the reception device to a maximum, it is advantageous if the electronic digital control device (microprocessor) of the reception device:

is made according to technology consuming little energy, for example CMOS technology;

controls the supply of the electrical apparatus, so that the latter is supplied fully, from the energy accumulator, only during exploitation of each sequence of information received from the emission device. If the type of electrical apparatus allows this, the latter is supplied only during each of said sequences and its electrical supply is cut between two consecutive sequences of information. On the other hand, if the electrical apparatus requires a maintenance supply between two sequences of information (as is for example the case for a digital display), this maintenance supply is reduced to what is just necessary;

itself functions in alternate phases of watching and full activity, controlled by itself, the detection of the reception of information triggering off placing said electronic control device in full activity.

The Figures of the accompanying drawing clearly show how the invention may be carried out. In these Figures, identical references designate like elements.

Figure 4:
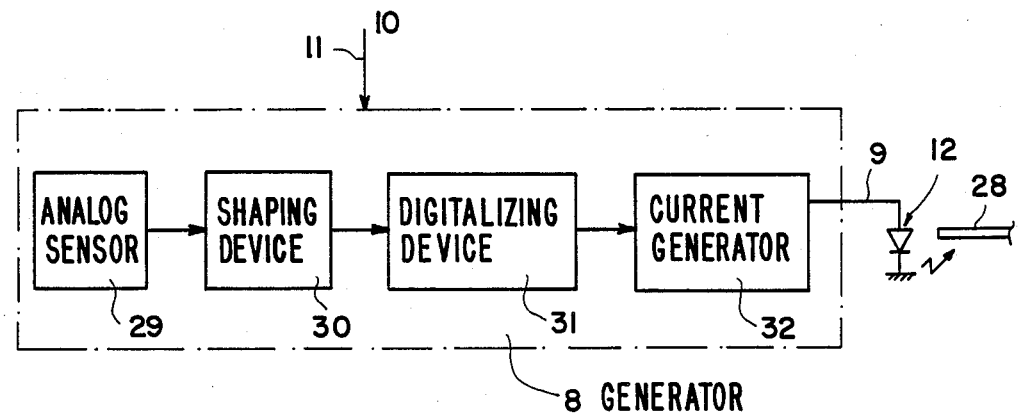

FIG. 4 gives the block diagram of the information generator of the emission device, associated with the first electro-optical converter.

Figure 5:
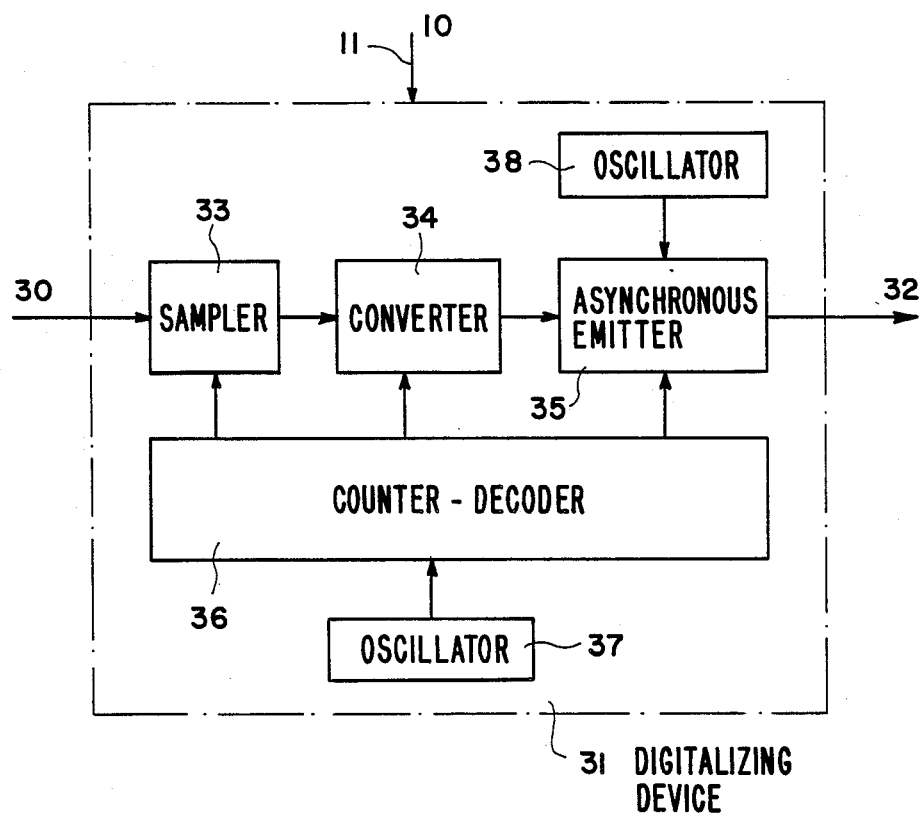

FIG. 5 illustrates an embodiment of the control of said generator.

FIG. 6 is a block diagram of an embodiment of the electrical device of the reception device, associated with the first opto-electrical converter.

FIG. 7 illustrates an example of information transmitted between the emission device and the reception device.

Figure 1:
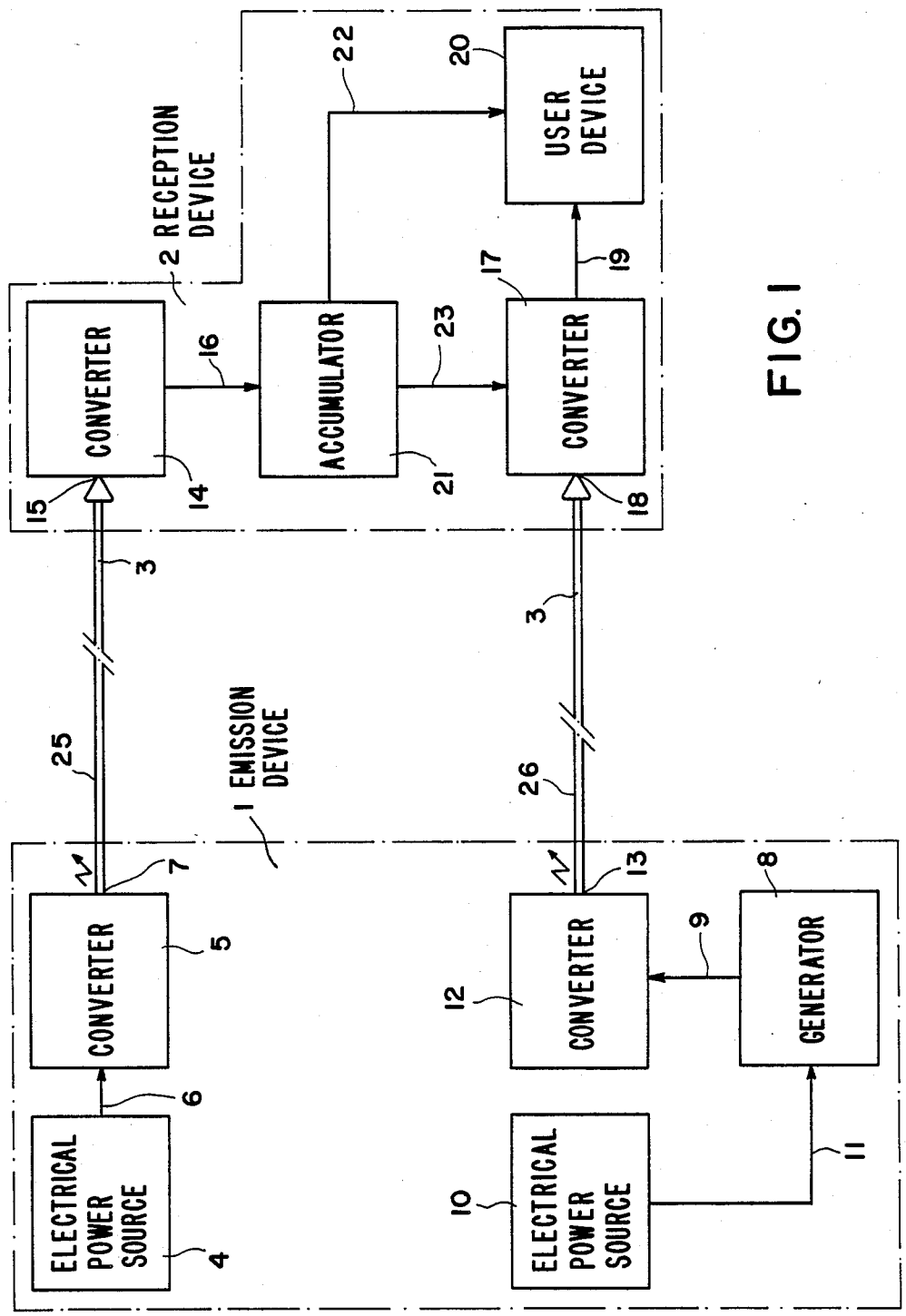
FIG. 1 is an overall block diagram of an embodiment of the system according to the invention.

The embodiment of the system according to the invention, schematically illustrated in FIG. 1, comprises an emission device 1 and a reception device 2, remote from each other and coupled by an optical channel 3. The reception device 2 is remote from any source of electrical supply and it is supplied both with electrical power and with information, from the emission device 1, via the optical channel 3.

The emission device 1 comprises:

a source of electrical supply, or source of electrical power 4;

an electro-optical power converter 5, receiving the electrical power from the source of supply 4, at its input 6, and capable of continuously converting the electrical energy of said source 4, so as to deliver, at its output 7, an optical energy representative of the electrical energy emitted by the source 4;

an electrical generator 8, capable of emitting digital information sequentially at its output 9;

another source of electrical supply 10, capable of supplying said generator 8 via a link 11. The source 10 may form part of the source 4 or may be independent thereof; and an electro-optical information converter 12, receiving the sequential digital information appearing at the output 9 of the generator 8, to convert it into optical information which it delivers at its output 13.

The different elements 4, 5, 8, 10 and 12 of the emission device 1 may be physically independent of one another and be relatively spaced apart, or, on the contrary, be close to one another and possibly united in one single unit.

Furthermore, the reception device 2 comprises:

an opto-electrical power converter 14 receiving at its input 15, through the optical channel 3, the optical energy available at the output 7 of the electro-optical power converter and delivering electrical energy at its output 16;

an opto-electrical information converter 17 receiving at its input 18, through the optical channel 3, the sequential optical information available at output 13 of the electro-optical information converter 12 and delivering at its output 19 sequential digital electrical information;

an electric user device 20 receiving said sequential digital information; and an electrical energy accumulator 21, of the capacitor or photoelectric cell type, receiving the electrical energy available at the output 16 of the opto-electrical power converter 14 and supplying the user device 20 with power, via line 22. The electrical energy accumulator 21 possibly supplies the second opto-electrical converter 17 via a line 23, when the nature of said converter requires supply.

It is thus seen that the user device 20 receives from the emission device 1, via the optical channel 3, both the electrical energy and the electrical information necessary for operation thereof.

Figure 2:
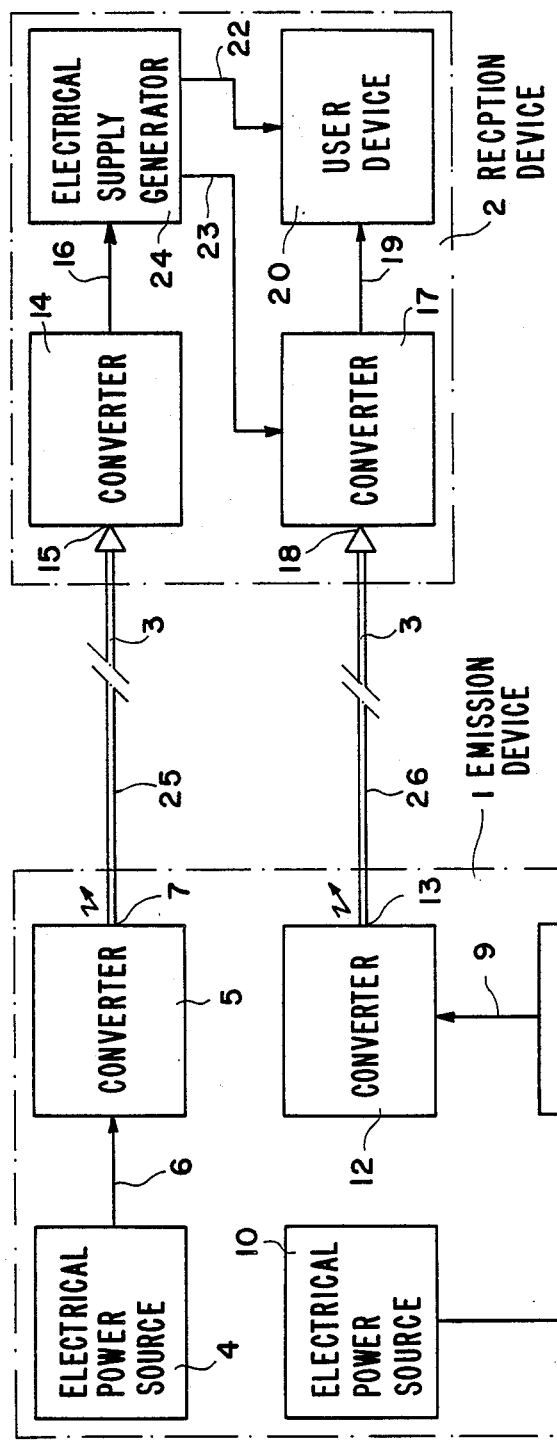
FIG. 2 is a block diagram of a variant embodiment of the system according to the invention.

In the variant embodiment of the system according to the invention shown in FIG. 2, the reception device 2 comprises an electrical supply source 24 of the accumulator battery or rechargeable cell type, charged with supplying the user device 20 and possibly the opto-electrical information converter 17. In this variant embodiment, the electrical energy appearing at the output 16 of the first opto-electrical power converter 14 is addressed to said source 24 in order to maintain the charge thereof. The emission device 1 of the system of FIG. 2 may be identical to that of the system of FIG. 1.

Of course, the different elements 14, 17, 20 and 21 or 24 of the reception device 2 may, like for the elements of the emission device 1, be physically independent of one another and be relatively spaced apart, or, on the contrary, may be close to one another and even be united into a single unit.

Furthermore, in FIGS. 1 and 2, the optical coupling channel 3 has been shown in the form of two independent optical fibers 25 and 26, the first connecting the output 7 of the electro-optical power converter 5 to the input 15 of the opto-electrical power converter 14 and the second coupling the output 13 of the electro-optical information converter 12 to the input 18 of the opto-electrical information converter 17. This representation illustrates just one possible embodiment for the optical channel 3, which might, for example, be produced with the aid of a directive optical beam, or by means of a single optical fiber assembly associated at its ends with appropriate commutators or couplers (not shown) or by means of a single optical fiber.

However, it is particularly advantageous to use independent optical fibers 25 and 26 to convey the power and the sequential information, respectively, as, in that case, the losses of power which result from the coupling of the information signals and the power signals, are avoided. In addition, it is easier to adapt each fiber to its specific function.

The electro-optical power converter 5 of the systems of FIGS. 1 and 2 may be a simple incandescent lamp or another similar powerful thermic light source. However, this converter might also be constituted by a laser diode. On the other hand, it is virtually impossible to use an electroluminescent diode due to the low power emitted by such a diode.

Whatever the electro-optical converter 5 chosen, it goes without saying that the opto-electrical power converter 14 must be adapted as best possible, in order that the power transmission output is as good as possible.

Such an opto-electrical power converter 14, associated with its energy accumulator 21 or 24, might be a photoelectric cell. However, it has been found that it was advantageous if said opto-electrical converter 14 is of the photodiode type, for example of gallium arsenide or silicon, functioning in photovoltaic mode. In this latter case, in order to obtain at the output of the energy accumulator 21 a voltage level, for example equal to 5 V, necessary for supplying the user device 20, several of such photodiodes are arranged in series.

Figure 3:
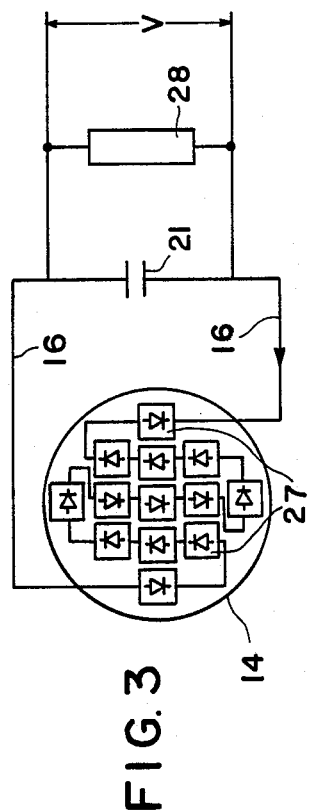
FIG. 3 shows an embodiment of the second opto-electrical converter of the reception device.

FIG. 3 shows an embodiment of the opto-electrical converter 14 constituted by a plurality of photodiodes 27 mounted in series. In that case, the energy accumulator 21 (connected to the photodiodes 27 by the link 16) is a capacitor, which is associated with a load resistor 28. At the terminals of the load resistor 28 appears voltage V, intended to supply the user device 20 and possibly the opto-electrical information converter 17.

Under these conditions, there may be available at the output 16 of the opto-electrical converter 14 a power at least equal to 500 $\mu$W, for example a current of 100 $\mu$A under 5 V, which is sufficient to supply an electronic TTL. The output of the converter 14 being of the order of 15%, it is then necessary that the latter receives, via the optical fiber 25, a power of at least 3.50 mW. Assuming (as in the experimental device made) that the attenuation introduced by said optical fiber is of the order of 20 dB, this implies that the electro-optical converter 5 emits a power of 350 mW, which is easily obtained by employing laser diodes.

The optical fiber 25 has, for example, a core diameter equal to 500 $\mu$m when the electro-optical converter 5 is of the thermic type. If this converter is a laser diode, the diameter of the optical fiber 25 may be reduced.

As shown in FIG. 4, the digital information generator 8 comprises, for example, an analog sensor or detector 29 of which the analog signal is shaped by a shaping device 30, then digitalized in a digitalization, serialization and coding device 31. The digital signal thus obtained is then transmitted to a current generator 32 attacking the electro-optical information converter 12, which, in that case, is advantageously an electroluminescent diode. Each of the elements 29 to 32 is supplied by source 10.

In the embodiment illustrated in FIG. 5, the digitalization, serialization and coding device 31 comprises a sampler 33 receiving the analog signal shaped by device 30, an analog-to-digital converter 34 receiving the signal sampled by said sampler 33 and an asynchronous series emitter 35 receiving the output signal from said analog-to-digital converter 34 and controlling the current generator 32. A counter-decoder 36 ensures cycle synchronization of the three devices 33, 34 and 35, whilst oscillators 37 and 38 respectively control the counter-decoder 36 and the asynchronous series emitter 35. The digitalization, serialization and coding device 31 is preferably made in the form of a microprocessor.

The opto-electrical information converter 17 may, like the opto-electrical converter 14, be of the photovoltaic type, which makes it possible to avoid an electrical supply from the accumulators 21 and 24, through line 23. However, in order to satisfy conditions of flowrates (for example 100 Kbit/s), it is sometimes useful to make this converter 17 in the form of a photodiode of PIN type, necessitating a polarization from said accumulators 21 or 24. Such an embodiment is for example shown in FIG. 6, in which the PIN diode bears reference 39 and is associated with a resistor 40.

The optical fiber 26, ensuring the optical link between the converters 12 and 17, is for example made of silica with a core diameter of the order of 100 $\mu$m.

The power received by the opto-electrical information converter 17 may be of the order of a microwatt.

The user device 20 (cf. FIG. 6) essentially comprises a device 41 for shaping the sequential information delivered by the opto-electrical converter 17 at its output 19, a device 42 for synchronization, sampling and for deserialization of this sequential information and an apparatus 43 (display, actuator, motor, etc. . . .) using said information.

The device 42, which is preferably made by a microprocessor of CMOS technology, comprises an asynchronous series receiver 44, controlled by an oscillator 45 and associated with a decoder 46.

When it is made alive (thanks to sources 4 and 10), the emission device 1, on the one hand, addresses energy via the optical fiber 25 to the reception device 2 and, on the other hand, permanently repeats a cycle of the following two functions:

measurement of the electric signal (voltage) delivered by the sensor 29;

transmission of this measurement in series mode to the reception device, via the optical fiber 26, then waiting for the following cycle.

Sequencing of these functions is ensured by the microprocessor 31 which is for example of the MOTOROLA MC 68 705 U3L type.

The microprocessor 31 controls the emission diode 12 (for example of the RTC CQF 34 type) by commutating its polarization current with the aid of a transistor (not shown) incorporated in the current generator 32. The electroluminescent diode 12 emits light when a positive logic level is presented by the microprocessor 31.

The light signal emitted by the diode 12 is, for example, coded in the manner illustrated on the timing diagram of FIG. 7:

at the beginning of a cycle, between instants t0 and t1, the microprocessor 31 makes the acquisition of the measurement made by the sensor 29 and the control of diode 12 is inactive;

when acquisition of the measurement is terminated, the control of diode 12 is active between instants t1 and t2 (for example distant by 200 $\mu$s), with the result that the latter emits a light bit 50;

then, during a duration T included between instants t2 and t3, control of the diode 12 is controlled in correspondence with the measurement made by sensor 29, with the result that there appears a plurality of light bits 51.1 to 51.n (for example eight in number) representative of the binary coding of said measurement;

subsequent to instant t3, between that instant and the following instant t4, the control of the diode 12 is active in order to deliver a light bit 52;

finally, from instant t4 to end-of-cycle instant t5, the control of diode 12 becomes inactive again.

The initial instant to of the following cycle corresponds to preceding end-of-cycle instant t5.

These sequences of light bits 50, 51.i (with 1≦i≦n) and 52 are transmitted by the optical fiber 26 to the converter 17 which converts them into corresponding sequences of electric bits.

The microprocessor 42 which may be of design identical to microprocessor 31 but which is made according to CMOS technology, monitors supply of power of apparatus 43 from the accumulator 21 (or 24), so that such supply takes place fully only when said apparatus exploits the information 50,51.i and 52. Apart from the appearance of this information, the microprocessor may:

either totally eliminate the electrical supply of said apparatus 43;

or supply the latter under a lesser voltage, in the case of said apparatus necessitating a maintenance supply between two sequences of such information.

The electrical consumption of the reception device 2 is thus further reduced.

In certain cases, said microprocessor 42 may moreover, for the same purpose, be operated in alternating periods of activity and of watching. As soon as it is in activity and it receives information 50,51.i and 52, the microprocessor 42 counts the latter to know whether it receives a complete message or whether it has been placed in activity whilst part of said information had already been emitted during its preceding period of watching. In the latter case, the microprocessor 42 awaits the following sequence of information before resuming watching.

We claim:

1. System for remote-control of an electric device (20) and comprising, an emission device (1) provided with a source of electrical supply (4), a generator (8) generating sequential electrical digital information intended for controlling said electric device (2), a first electro-optical converter (12) electrically connected to the generator for receiving and converting said sequential electrical information into sequential optical information, as well as a second electro-optical converter (5) for converting the electrical energy of said supply source (4) into optical energy, a reception device (2) optically connected to the emission device and provided with a first opto-electrical converter (17) capable of reconverting said sequential information into sequential electrical information, a second opto-electrical converter (14) optically connected to said second electro-optical converter (5) and capable of reconverting the optical energy into electrical energy, and an accumulator of electrical energy (21,24) capable of storing the electrical energy delivered by said second opto-electrical converter (14) and of supplying electrical energy, at least partially, to the electric device (20), said electric device (20) comprising an electrical apparatus (43) and a digital control device (42) controlling said apparatus by means of said reconverted sequential information generated by said first opto-electrical converter (17) and controlling supply of said electrical energy to said apparatus (43) so that the electrical energy is supplied fully from said energy accumulator (21, 24) only during exploitation of each sequence of said reconverted electrical information.

2. System according to claim 1, characterized in that said electronic control device (42) controls its own operation in alternating phases of watching and of full activity.

3. System according to one of claims 1 or 2, characterized in that said electronic digital device (42) comprises a microprocessor.

4. System according to claim 1, characterized in that said first opto-electrical converter (17) of the reception device (2) is a photodiode of PIN type.

5. System according to claim 1, characterized in that said generator (8) of the emission device (1) comprises a microprocessor.

6. System according to claim 1, characterized in that said electronic control device (42) is made according to CMOS technology.

7. System according to claim 1, characterized in that said second electro-optical converter (5) is a laser diode.

8. System according to claim 1, characterized in that said second opto-electrical converter (14) is formed by the mounting in series of a plurality of photodiodes (27) operating in photovoltaic mode.

9. System according to claim 1, characterized in that said energy accumulator (21, 24) is a capacitor.

10. System according to claim 1, characterized in that said energy accumulator (21, 24) is a photoelectric cell.

11. System according to claim 1, characterized in that said energy accumulator (21, 24) delivers the total electrical supply of said electric device (20).

12. System according to claim 1, characterized in that said energy accumulator (21, 24) participates in the electrical supply of said electric device (20).

13. System according to claim 1, characterized in that the optical channel (3) connecting said emission device (1) and said reception device (2) comprises tow independent optical fiber arrangements (25, 26), respectively allocated to the transmission of said optical information and to that of the optical energy.

14. A remote-control system for controlling an electrical device comprising an emission device including a source of electrical energy, a generator adapted for producing sequential digital information for controlling said electrical device, a first electro-optical converter adapted for converting said sequential information in sequential optical information, a second electro-optical converter adapted for converting electrical energy to optical energy, a reception device optically connected to the emission device and first opto-electrical converter adapted for receiving and reconverting said sequential optical information into sequential electrical information, a second opto-electrical converter adapted for receiving and reconverting said optical energy into electrical energy, an accumulator for receiving said electrical energy and adapted for storing and delivering said electrical energy to the electrical device, wherein said electrical device includes an electrical apparatus and a digital control means adapted to receive said reconverted sequential electrical information, and to control the supply of electrical energy to said electrical apparatus, wherein said electrical information is produced in sequences and said electrical energy is supplied to the electrical apparatus at predetermined sequences.

* * * * *